United States Patent
Back et al.

(10) Patent No.: US 12,063,665 B2
(45) Date of Patent: Aug. 13, 2024

(54) OPERATION METHOD OF UE RELATED TO SIDELINK DRX TIMER IN WIRELESS COMMUNICATION SYSTEM

(71) Applicant: LG Electronics Inc., Seoul (KR)

(72) Inventors: Seoyoung Back, Seoul (KR); Seungmin Lee, Seoul (KR); Giwon Park, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/348,014

(22) Filed: Jul. 6, 2023

(65) Prior Publication Data

US 2024/0015767 A1   Jan. 11, 2024

Related U.S. Application Data

(63) Continuation of application No. PCT/KR2022/003164, filed on Mar. 7, 2022.

(60) Provisional application No. 63/165,111, filed on Mar. 23, 2021.

(30) Foreign Application Priority Data

Mar. 5, 2021   (KR) .................. 10-2021-0029607

(51) Int. Cl.
*H04W 72/25*   (2023.01)
*H04L 1/1812*   (2023.01)
*H04W 52/02*   (2009.01)
*H04W 76/28*   (2018.01)

(52) U.S. Cl.
CPC ........... *H04W 72/25* (2023.01); *H04L 1/1812* (2013.01); *H04W 52/0225* (2013.01); *H04W 76/28* (2018.02)

(58) Field of Classification Search
CPC . H04W 72/25; H04W 52/0225; H04W 76/28; H04L 1/1812
See application file for complete search history.

(56) References Cited

U.S. PATENT DOCUMENTS

| | | | |
|---|---|---|---|
| 2022/0287142 A1* | 9/2022 | Li | H04W 24/10 |
| 2023/0014303 A1* | 1/2023 | Di Girolamo | H04W 72/20 |
| 2023/0208563 A1* | 6/2023 | Liang | H04L 1/1822 370/311 |
| 2023/0389047 A1* | 11/2023 | Liu | H04L 1/1812 |

* cited by examiner

*Primary Examiner* — Walli Z Butt
(74) *Attorney, Agent, or Firm* — Fish & Richardson P.C.

(57) ABSTRACT

One embodiment relates to a method for sidelink related operation of a receiving (RX) user equipment (UE) in a wireless communication system, the method comprising the steps in which: the RX UE receives first SCI from a transmitting UE (TX UE) through a physical sidelink control channel (PSCCH); and the RX UE receives a physical sidelink shared channel (PSSCH) and second SCI from the TX UE on the basis of the first SCI, wherein the second SCI includes information about activating physical sidelink feedback channel (PSFCH) transmission related to the PSSCH, and whether to start a retransmission timer on the basis of the PSFCH transmission being dropped is determined on the basis of whether the dropped PSFCH transmission is related to either NACK or ACK.

10 Claims, 19 Drawing Sheets

OPERATION METHOD OF UE RELATED TO SIDELINK DRX TIMER IN WIRELESS COMMUNICATION SYSTEM

CROSS-REFERENCE TO RELATED APPLICATIONS

This application is a continuation of International Application No. PCT/KR2022/003164, filed on Mar. 7, 2022, which claims the benefit of U.S. Provisional Application No. 63/165,111, filed on Mar. 23, 2021, and Korean Application No. 10-2021-0029607, filed on Mar. 5, 2021. The disclosures of the prior applications are incorporated by reference in their entirety.

TECHNICAL FIELD

The present disclosure relates to a wireless communication system, and more particularly, to a method and apparatus related to a sidelink discontinuous reception (DRX) timer.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

The object of embodiment(s) is to provide a method for operations related to a discontinuous reception (DRX) timer when transmission of a physical sidelink feedback channel (PSFCH) is dropped in sidelink DRX.

In an aspect of the present disclosure, there is provided a sidelink related operation method for a receiving user equipment (RX UE) in a wireless communication system. The method may include: receiving, by the RX UE, first sidelink control information (SCI) from a transmitting user equipment (TX UE) over a physical sidelink control channel (PSCCH); and receiving, by the RX UE, a physical sidelink shared channel (PSSCH) and second SCI from the TX UE based on the first SCI. The second SCI may include information for activating transmission of a physical sidelink feedback channel (PSFCH) related to the PSSCH. Whether to start a retransmission timer based on the PSFCH transmission being dropped may be determined depending on whether the dropped PSFCH transmission is related to an acknowledgement (ACK) or a negative acknowledgement (NACK).

In another aspect of the present disclosure, there is provided an RX UE in a wireless communication system. The RX UE may include: at least one processor; and at least one computer memory operably connected to the at least one processor and configured to store instructions that, when executed, cause the at least one processor to perform operations. The operations may include: receiving first SCI from a TX UE over a PSCCH; and receiving a PSSCH and second SCI from the TX UE based on the first SCI. The second SCI may include information for activating transmission of a PSFCH related to the PSSCH. Whether to start a retransmission timer based on the PSFCH transmission being dropped may be determined depending on whether the dropped PSFCH transmission is related to an ACK or a NACK.

In another aspect of the present disclosure, there is provided a processor configured to perform operations for an RX UE in a wireless communication system. The operations may include: receiving first SCI from a TX UE over a PSCCH; and receiving a PSSCH and second SCI from the TX UE based on the first SCI. The second SCI may include information for activating transmission of a PSFCH related to the PSSCH. Whether to start a retransmission timer based on the PSFCH transmission being dropped may be determined depending on whether the dropped PSFCH transmission is related to an ACK or a NACK.

In a further aspect of the present disclosure, there is provided a non-volatile computer-readable storage medium configured to store at least one computer program including instructions that, when executed by at least one processor, cause the at least one processor to perform operations for a TX UE. The operations may include: receiving first SCI from a TX UE over a PSCCH; and receiving a PSSCH and second SCI from the TX UE based on the first SCI. The second SCI may include information for activating transmission of a PSFCH related to the PSSCH. Whether to start a retransmission timer based on the PSFCH transmission being dropped may be determined depending on whether the dropped PSFCH transmission is related to an ACK or a NACK.

Based on that the PSFCH is related to the NACK, the RX UE may be configured to start the retransmission timer, and based on that the PSFCH is related to the ACK, the RX UE may be configured not to start the retransmission timer.

A round trip time (RTT) timer may be started based on a PSFCH resource.

The PSSCH may be related to unicast.

An RTT timer may be related to transition to a sleep mode after the PSFCH transmission.

The retransmission timer may be related to receiving a retransmission from the TX UE based on the PSFCH.

The RX UE may be configured to maintain a wake-up state during the retransmission timer.

The PSSCH may be related to groupcast.

The PSFCH may be related to NACK-only hybrid automatic repeat request (HARQ) feedback.

The RX UE may be configured to communicate with at least one of another user equipment (UE), a UE related to an autonomous vehicle, a base station, or a network.

According to one embodiment, even when a physical sidelink feedback channel (PSFCH) is dropped, a receiving user equipment (RX UE) may start a retransmission timer after expiration of a round trip time (RTT) timer, thereby stably receiving physical sidelink control channel (PSSCH) retransmission in a wake-up state.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
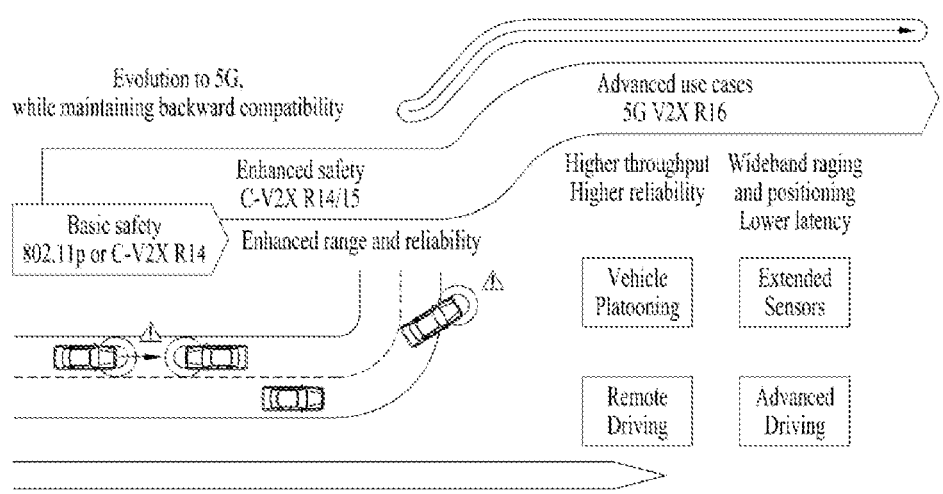
FIG. 1 is a diagram comparing vehicle-to-everything (V2X) communication based on pre-new radio access technology (pre-NR) with V2X communication based on NR.
Figure 2:
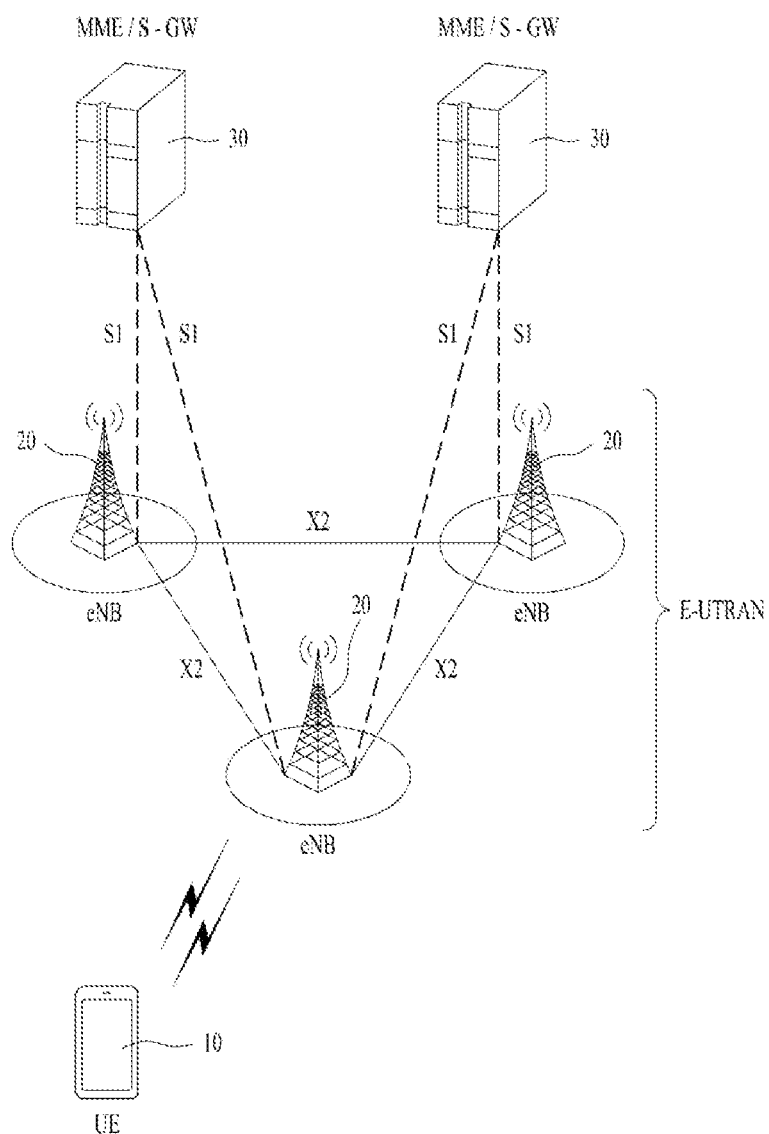
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figures 3A, 3B:
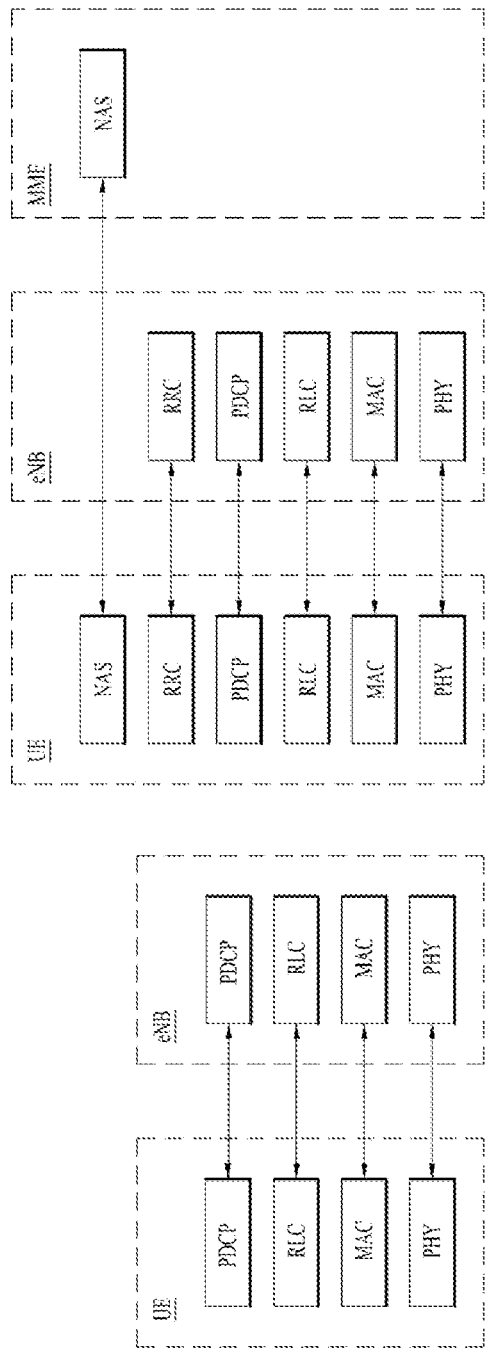
FIGS. 3A and 3B are diagrams illustrating user-plane and control-plane radio protocol architectures according to an embodiment of the present disclosure.

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RB s. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
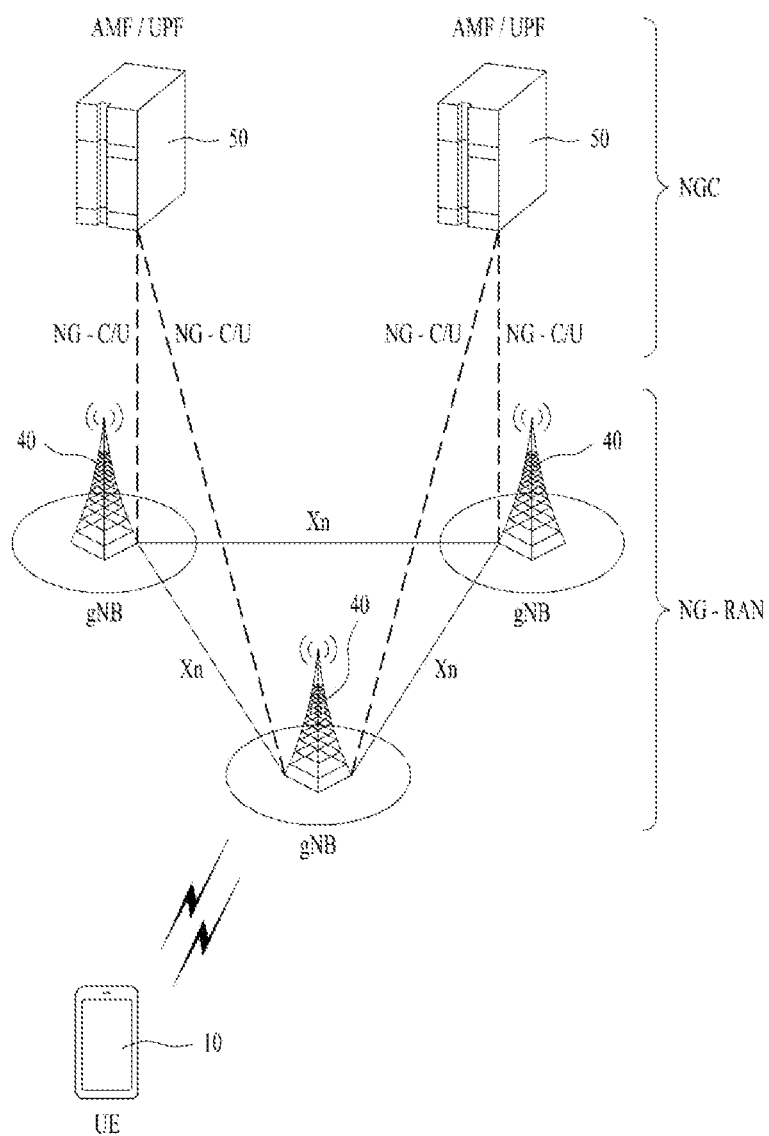
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
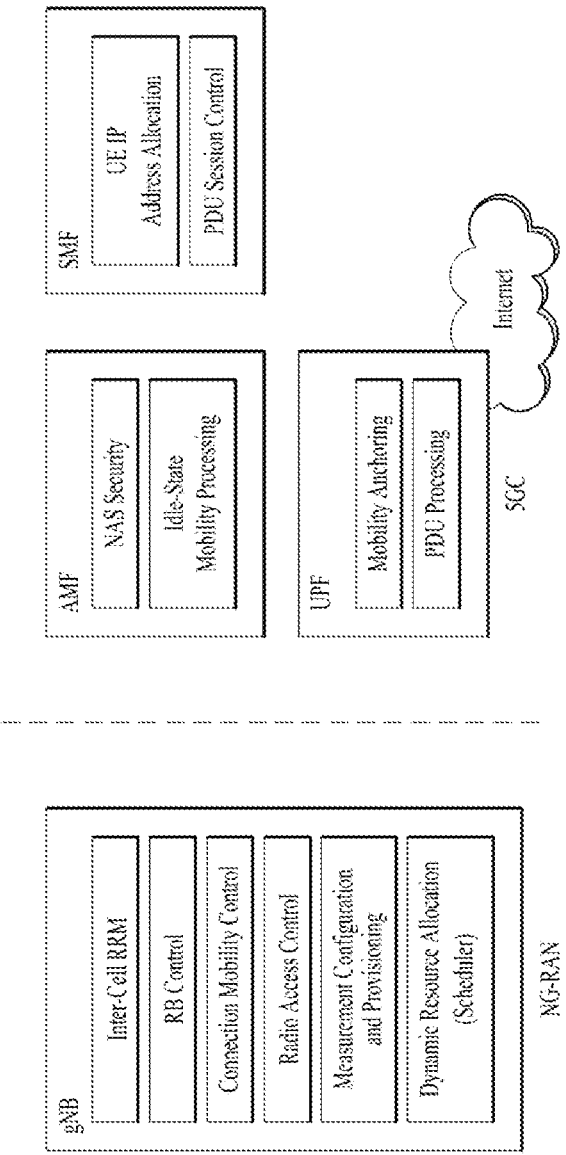
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
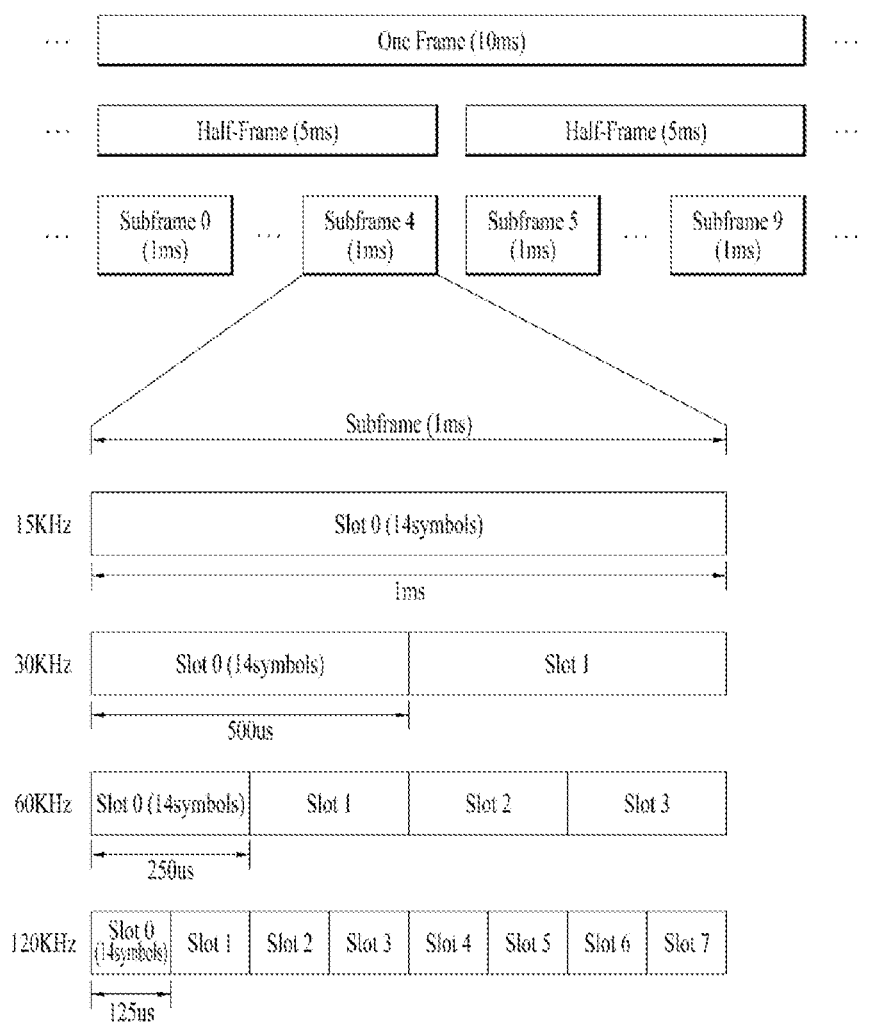
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration µ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
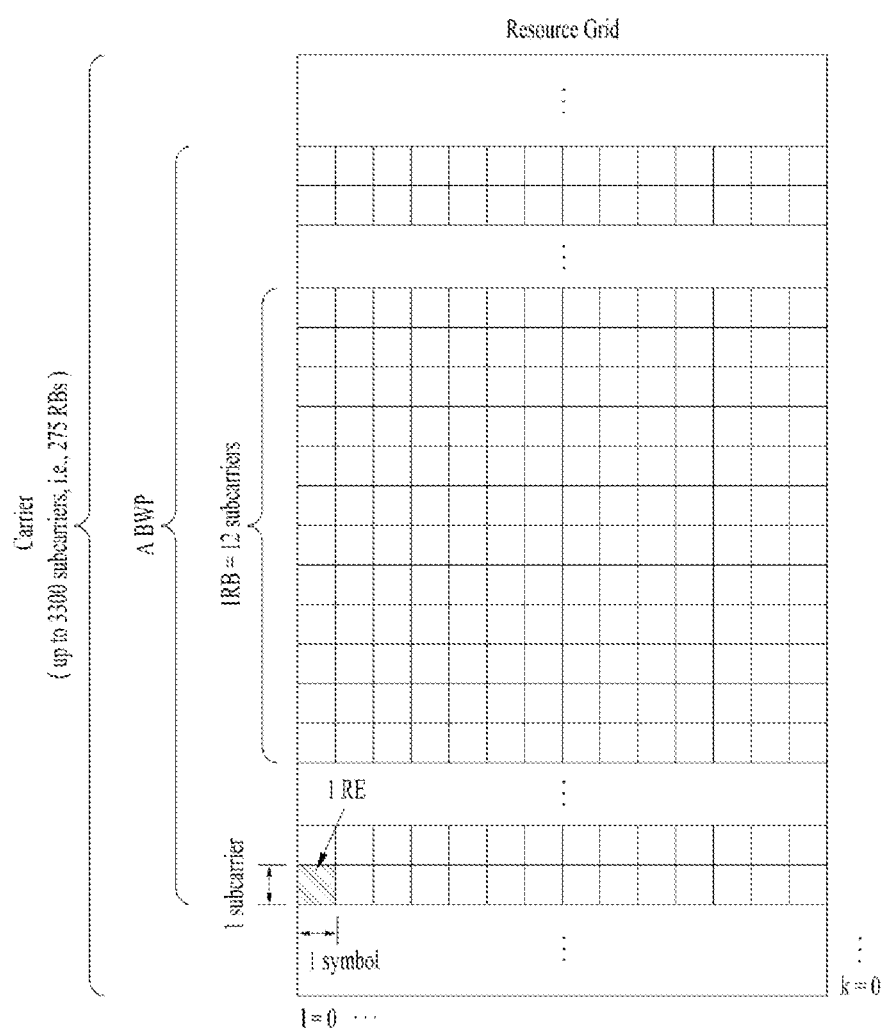
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCP layer, or the SDAP layer. For example, L3 may refer to the RRC layer.

Now, a description will be given of sidelink (SL) communication.

Figure 8A:
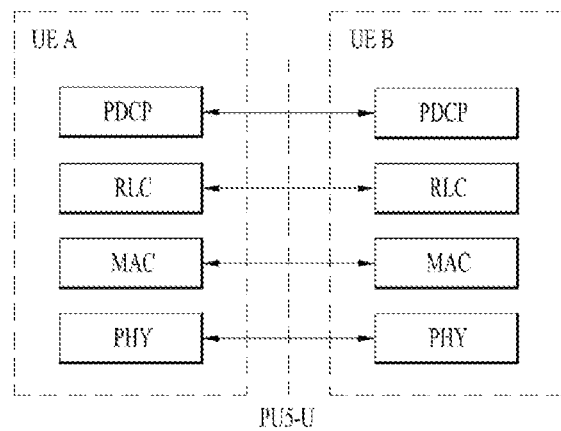
FIGS. 8A and 8B are diagrams illustrating radio protocol architectures for sidelink (SL) communication according to an embodiment of the present disclosure.
Figure 8B:
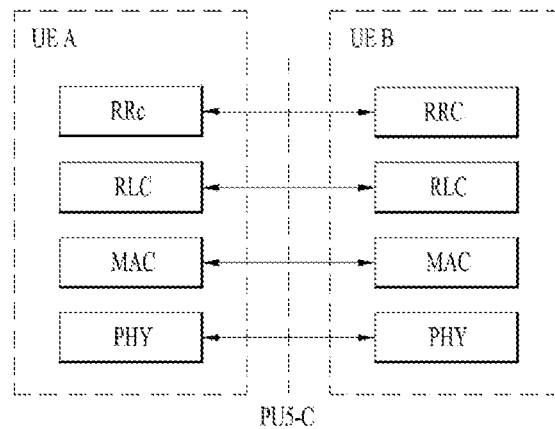

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
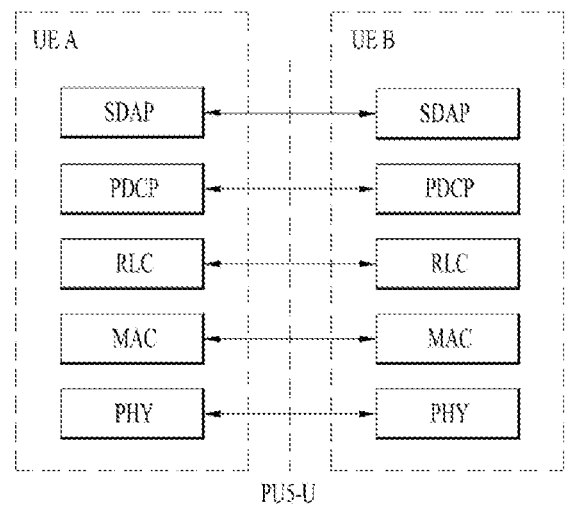
FIGS. 9A and 9B are diagrams illustrating radio protocol architectures for SL communication according to an embodiment of the present disclosure.
Figure 9B:
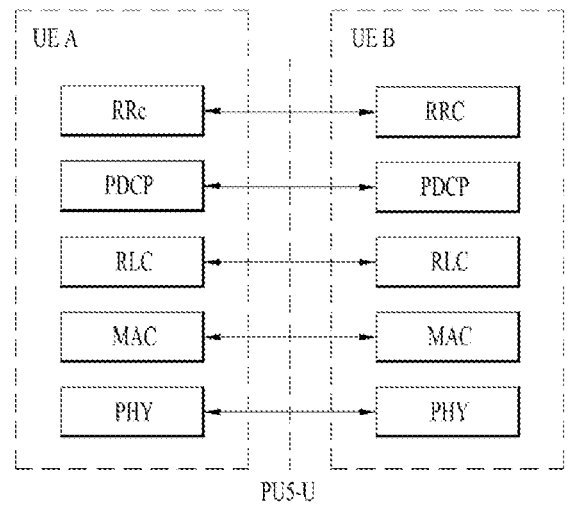

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR.

Figures 10A, 10B:
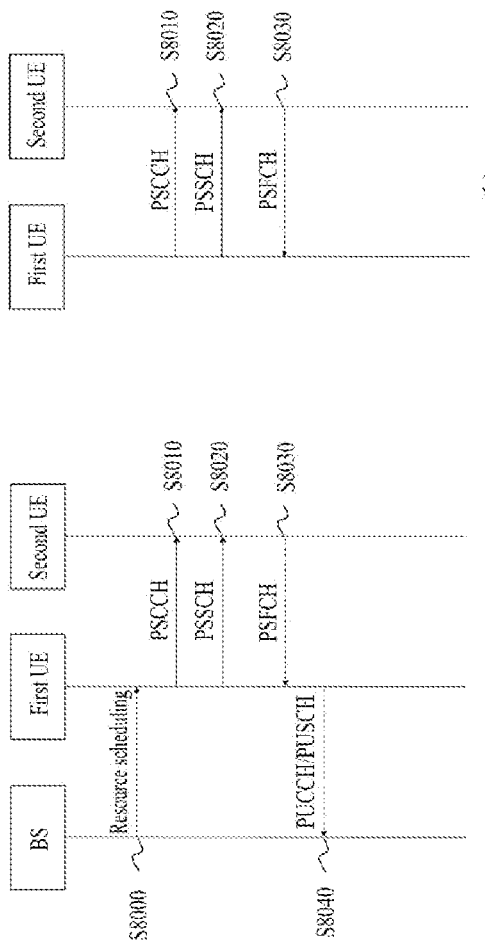
FIGS. 10A and 10B are diagrams illustrating a procedure for performing V2X or SL communication by a UE according to a transmission mode.

FIGS. 10A and 10B illustrate a procedure of performing V2X or SL communication by a UE depending on a transmission mode according to an embodiment of the present disclosure. The embodiment of FIGS. 10A and 10B may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 10A illustrates a UE operation related to LTE transmission mode 1 or LTE transmission mode 3. Alternatively, for example, FIG. 10A illustrates a UE operation related to NR resource allocation mode 1. For example, LTE transmission mode 1 may apply to general SL communication, and LTE transmission mode 3 may apply to V2X communication.

For example, FIG. 10B illustrates a UE operation related to LTE transmission mode 2 or LTE transmission mode 4. Alternatively, for example, FIG. 10B illustrates a UE operation related to NR resource allocation mode 2.

Referring to FIG. 10A, in LTE transmission mode 1, LTE transmission mode 3, or NR resource allocation mode 1, a BS may schedule an SL resource to be used for SL transmission by a UE. For example, in step S8000, the BS may transmit information related to an SL resource and/or information related to a UE resource to a first UE. For example, the UL resource may include a physical uplink control channel (PUCCH) resource and/or a physical uplink shared channel (PUSCH) resource. For example, the UL resource may be a resource to report SL HARQ feedback to the BS.

For example, the first UE may receive information related to a Dynamic Grant (DG) resource and/or information related to a Configured Grant (CG) resource from the BS. For example, the CG resource may include a CG type 1 resource or a CG type 2 resource. In the present specification, the DG resource may be a resource that the BS configures/allocates to the first UE in Downlink Control Information (DCI). In the present specification, the CG resource may be a (periodic) resource configured/allocated by the BS to the first UE in DCI and/or an RRC message. For example, for the CG type 1 resource, the BS may transmit an RRC message including information related to the CG resource to the first UE. For example, for the CG type 2 resource, the BS may transmit an RRC message including information related to the CG resource to the first UE, and the BS may transmit DCI related to activation or release of the CG resource to the first UE.

In step S8010, the first UE may transmit a physical sidelink control channel (PSCCH) (e.g., Sidelink Control Information (SCI) or 1st-stage SCI) to a second UE based on the resource scheduling. In step S8020, the first UE may transmit a physical sidelink shared channel (PSSCH) (e.g., 2nd-stage SCI, MAC PDU, data, etc.) related to the PSCCH to the second UE. In step S8030, the first UE may receive a physical sidelink feedback channel (PSFCH) related to the PSCCH/PSSCH from the second UE. For example, HARQ feedback information (e.g., NACK information or ACK information) may be received from the second UE over the PSFCH. In step S8040, the first UE may transmit/report HARQ feedback information to the BS over a PUCCH or PUSCH. For example, the HARQ feedback information reported to the BS may include information generated by the first UE based on HARQ feedback information received from the second UE. For example, the HARQ feedback information reported to the BS may include information generated by the first UE according to a predetermined rule. For example, the DCI may be DCI for scheduling of SL. For example, the format of the DCI may include DCI format 3_0 or DCI format 3_1. Table 5 shows one example of DCI for scheduling of SL.

TABLE 5

7.3.1.4.1 Format 3_0
DCI format 3_0 is used for scheduling of NR PSCCH and NR PSSCH in one cell.
The following information is transmitted by means of the DCI format 3_0 with CRC
scrambled by SL-RNTI or SL-CS-RNTI:
- Resource pool index - $\lceil \log_2 I \rceil$ bits, where I is the number of resource pools for
  transmission configured by the higher layer parameter sl-TxPoolScheduling.
- Time gap - 3 bits determined by higher layer parameter sl-DCI-ToSL-Trans, as
  defined in clause 8.1.2.1 of [6, TS 38.214]
- HARQ process number - 4 bits.
- New data indicator - 1 bit.
- Lowest index of the subchannel allocation to the initial transmission -
  $\lceil \log_2(N_{subChannel}^{SL}) \rceil$ bits as defined in clause 8.1.2.2 of [6, TS 38.214]
- SCI format 1-A fields according to clause 8.3.1.1:
  - Frequency resource assignment.
  - Time resource assignment.
- PSFCH-to-HARQ feedback timing indicator - $\lceil \log_2 N_{fb\_timing} \rceil$ bits, where $N_{fb\_timing}$
  is the number of entries in the higher layer parameter sl-PSFCH-ToPUCCH, as defined
  in clause 16.5 of [5, TS 38.213]
- PUCCH resource indicator - 3 bits as defined in clause 16.5 of [5, TS 38.213].
- Configuration index - 0 bit if the UE is not configured to monitor DCI format 3_0
  with CRC scrambled by SL-CS-RNTI; otherwise 3 bits as defined in clause 8.1.2 of [6,
  TS 38.214]. If the UE is configured to monitor DCI format 3_0 with CRC scrambled
  by SL-CS-RNTI, this field is reserved for DCI format 3_0 with CRC scrambled by SL-
  RNTI.
- Counter sidelink assignment index - 2 bits
  - 2 bits as defined in clause 16.5.2 of [5, TS 38.213] if the UE is configured with
    pdsch-HARQ-ACK-Codebook = dynamic
  - 2 bits as defined in clause 16.5.1 of [5, TS 38.213] if the UE is configured with
    pdsch-HARQ-ACK-Codebook = semi-static
- Padding bits, if required
If multiple transmit resource pools are provided in sl-TxPoolScheduling, zeros shall be
appended to the DCI format 3_0 until the payload size is equal to the size of a DCI format
3_0 given by a configuration of the transmit resource pool resulting in the largest number of
information bits for DCI format 3_0.
If the UE is configured to monitor DCI format 3_1 and the number of information bits in
DCI format 3_0 is less than the payload of DCI format 3_1, zeros shall be appended to DCI
format 3_0 until the payload size equals that of DCI format 3_1.
7.3.1.4.2 Format 3_1
DCI format 3_1 is used for scheduling of LTE PSCCH and LTE PSSCH in one cell.
The following information is transmitted by means of the DCI format 3_1 with CRC
scrambled by SL Semi-Persistent Scheduling V-RNTI:
- Timing offset - 3 bits determined by higher layer parameter sl-TimeOffsetEUTRA-
  List, as defined in clause 16.6 of [5, TS 38.213]
- Carrier indicator -3 bits as defined in 5.3.3.1.9A of [11, TS 36.212].
- Lowest index of the subchannel allocation to the initial transmission -
  $\lceil \log_2(N_{subchannel}^{SL}) \rceil$ bits as defined in 5.3.3.1.9A of [11, TS 36.212].
- Frequency resource location of initial transmission and retransmission, as defined in
  5.3.3.1.9A of [11, TS 36.212]
- Time gap between initial transmission and retransmission, as defined in 5.3.3.1.9A of
  [11, TS 36.212]
- SL index - 2 bits as defined in 5.3.3.1.9A of [11, TS 36.212]
- SL SPS configuration index - 3 bits as defined in clause 5.3.3.1.9A of [11, TS
  36.212].
- Activation/release indication - 1 bit as defined in clause 5.3.3.1.9A of [11, TS
  36.212].

Referring to FIG. 10B, for LTE transmission mode 2, LTE transmission mode 4, or NR resource allocation mode 2, a UE may determine an SL transmission resource from among SL resources configured by a BS/network or preconfigured SL resources. For example, the configured SL resources or preconfigured SL resources may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in step S8010, the first UE having self-selected a resource in the resource pool may transmit a PSCCH (e.g., Sidelink Control Information (SCI) or 1$^{st}$-stage SCI) to the second UE using the resource. In step S8020, the first UE may transmit a PSSCH (e.g., 2$^{nd}$-stage SCI, MAC PDU, data, etc.) related to the PSCCH to the second UE. In step S8030, the first UE may receive a PSFCH related to the PSCCH/PSSCH from the second UE.

Referring to FIG. 10A or FIG. 10B, for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as 1st SCI, 1st-stage SCI, or a 1st-stage SCI format, and the SCI transmitted on the PSSCH may be referred to as 2nd SCI, 2nd SCI, or a 2nd-stage SCI format. For example, the 1st-stage SCI format may include SCI format 1-A, and the 2nd-stage SCI format may include SCI format 2-A and/or SCI format 2-B. Table 6 shows one example of a 1st-stage SCI format.

TABLE 6

8.3.1.1 SCI format 1-A

SCI format 1-A is used for the scheduling of PSSCH and $2^{nd}$-stage-SCI on PSSCH
The following information is transmitted by means of the SCI format 1-A:
  Priority - 3 bits as specified in clause 5.4.3.3 of [12, TS 23.287] and clause 5.22.1.3.1
of [8, TS 38.321]. Value '000' of Priority field corresponds to priority value '1', value
'001' of Priority field corresponds to priority value '2', and so on.

Frequency resource assignment $-\left\lceil\log_2\left(\frac{N_{subChannel}^{SL}(N_{subChannel}^{SL}+1)}{2}\right)\right\rceil$ bits when the value of the higher layer parameter
sl-MaxNumPerReserve is configured to 2; otherwise $\left\lceil\log_2\left(\frac{N_{subChannel}^{SL}(N_{subChannel}^{SL}+1)(2N_{subChannel}^{SL}+1)}{6}\right)\right\rceil$ bits when the value of the higher layer parameter sl-MaxNumPerReserve
 is configured to 3, as defined in clause 8.1.5 of [6,TS 38.214].
  Time resource assignment - 5 bits when the value of the higher layer parameter sl-
MaxNumPerReserve is configured to 2; otherwise 9 bits when the value of the higher
layer parameter sl-MaxNumPerReserve is configured to 3, as defined in clause 8.1.5 of
[6, TS 38.214].
  Resource reservation period - $\lceil\log_2 N_{rsv\_period}\rceil$ bits as defined in clause 16.4 of
[5, TS 38.213], where $N_{rsv\_period}$ is the number of entries in the higher layer parameter
sl-ResourceReservePeriodList, if higher layer parameter sl-MultiReserveResource is
configured; 0 bit otherwise.
  DMRS pattern - $\lceil\log_2 N_{pattern}\rceil$ bits as defined in clause 8.4.1.1.2 of [4, TS 38.211],
where $N_{pattern}$ is the number of DMRS patterns configured by higher layer parameter
sl-PSSCH-DMRS-TimePatternList.
  $2^{nd}$-stage SCI format - 2 bits as defined in Table 8.3.1.1-1.
  Beta_offset indicator - 2 bits as provided by higher layer parameter sl-
BetaOffsets2ndSCI and Table 8.3.1.1-2.
  Number of DMRS port - 1 bit as defined in Table 8.3.1.1-3.
  Modulation and coding scheme - 5 bits as defined in clause 8.1.3 of [6, TS 38.214].
  Additional MCS table indicator - as defined in clause 8.1.3.1 of [6, TS 38.214]: 1 bit
if one MCS table is configured by higher layer parameter sl-Additional-MCS-Table; 2
bits if two MCS tables are configured by higher layer parameter sl-Additional-MCS-
Table; 0 bit otherwise.
  PSFCH overhead indication - 1 bit as defined clause 8.1.3.2 of [6, TS 38.214] if
higher layer parameter sl-PSFCH-Period = 2 or 4; 0 bit otherwise.
  Reserved - a number of bits as determined by higher layer parameter sl-
NumReservedBits, with value set to zero.

Table 7 shows one example of a 2nd-stage SCI format.

TABLE 7

8.4 Sidelink control information on PSSCH
SCI carried on PSSCH is a 2nd-stage SCI, which transports sidelink scheduling information.
8.4.1 2nd-stage SCI formats
The fields defined in each of the $2^{nd}$-stage SCI formats below are mapped to the information
bits $\alpha_0$ to $\alpha_{A-1}$ as follows:
Each field is mapped in the order in which it appears in the description, with the first field
mapped to the lowest order information bit $\alpha_0$ and each successive field mapped to higher
order information bits. The most significant bit of each field is mapped to the lowest order
information bit for that field, e.g. the most significant bit of the first field is mapped to do.
8.4.1.1 SCI format 2-A
SCI format 2-A is used for the decoding of PSSCH, with HARQ operation when HARQ-ACK
information includes ACK or NACK, when HARQ-ACK information includes only NACK,
or when there is no feedback of HARQ-ACK information.
The following information is transmitted by means of the SCI format 2-A:
  -   HARQ process number - 4 bits.
  -   New data indicator - 1 bit.
  -   Redundancy version - 2 bits as defined in Table 7.3.1.1.1-2.
  -   Source ID - 8 bits as defined in clause 8.1 of [6, TS 38.214].
  -   Destination ID - 16 bits as defined in clause 8.1 of [6, TS 38.214].
  -   HARQ feedback enabled/disabled indicator - 1 bit as defined in clause 16.3 of [5, TS
38.213].
  -   Cast type indicator - 2 bits as defined in Table 8.4.1.1-1 and in clause 8.1 of [6, TS
38.214].
  -   CSI request - 1 bit as defined in clause 8.2.1 of [6, TS 38.214] and in clause 8.1 of [6,
TS 38.214].

Referring to FIG. 10A or FIG. 10B, in step S8030, the first UE may receive the PSFCH based on Table 8. For example, the first UE and the second UE may determine a PSFCH resource based on Table 8, and the second UE may transmit HARQ feedback to the first UE using the PSFCH resource.

TABLE 8

16.3  UE procedure for reporting HARQ-ACK on sidelink
A UE can be indicated by an SCI format scheduling a PSSCH reception to transmit a PSFCH with HARQ-ACK information in response to the PSSCH reception. The UE provides HARQ-ACK information that includes ACK or NACK, or only NACK.
A UE can be provided, by sl-PSFCH-Period, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.
A UE is provided by sl-PSFCH-RB-Set a set of $M_{PRB, set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch, slot}^{PSFCH}, (i + 1 + j \cdot N_{PSSCH}^{PSFCH}) \cdot M_{subch, slot}^{PSFCH} - 1]$ PRBs from the $M_{PRB, set}^{PSFCH}$ PRBs to slot i among the PSSCH slots associated with the PSFCH slot and sub-channel j, where $M_{subch, slot}^{PSFCH} = M_{PRB, set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB, set}^{PSFCH}$ is a multiple of $N_{subch} \cdot N_{PSSCH}^{PSFCH}$.
The second OFDM symbol l' of PSFCH transmission in a slot is defined as l' = sl-StartSymbol + sl-LengthSymbols − 2 .
A UE determines a number of PSFCH resources available for multiplexing HARQ-ACK information in a PSFCH transmission as $R_{PRB, CS}^{PSFCH} = N_{type}^{PSFCH} \cdot M_{subch, slot}^{PSFCH} \cdot N_{CS}^{PSFCH}$ where $N_{CS}^{PSFCH}$ is a number of cyclic shift pairs for the resource pool provided by sl-NumMuxCS-Pair and, based on an indication by sl-PSFCH-CandidateResourceType,
- if sl-PSFCH-CandidateResourceType is configured as startSubCH, $N_{type}^{PSFCH} = 1$ and the $M_{subch, slot}^{PSFCH}$ PRBs are associated with the starting sub-channel of the corresponding PSSCH;
- if sl-PSFCH-CandidateResourceType is configured as allocSubCH, $N_{type}^{PSFCH} = N_{subch}^{PSSCH}$ and the $N_{subch}^{PSSCH} \cdot M_{subch, slot}^{PSFCH}$ PRBs are associated with the $N_{subch}^{PSSCH}$ sub-channels of the corresponding PSSCH.
The PSFCH resources are first indexed according to an ascending order of the PRB index, from the $N_{type}^{PSFCH} \cdot M_{subch, slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID}) \bmod R_{PRB, CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift α [4, TS 38.211], from a cyclic shift pair index corresponding to a PSFCH resource index and from $N_{CS}^{PSFCH}$ using Table 16.3-1.

Referring to FIG. 10A, in step S8040, the first UE may transmit SL HARQ feedback to the BS over the PUCCH and/or PUSCH based on Table 9.

TABLE 9

16.5  UE procedure for reporting HARQ-ACK on uplink
A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.
For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
From a number of PSFCH reception occasions, the UE generates HARQ-ACK information to TABLE 9-continued report in a PUCCH or PUSCH transmission. The UE can be indicated by a SCI format to perform one of the following and the UE constructs a HARQ-ACK codeword with HARQ-ACK information, when applicable
- for one or more PSFCH reception occasions associated with SCI format 2-A with Cast type indicator field value of "10"
  - generate HARQ-ACK information with same value as a value of HARQ-ACK information the UE determines from the last PSFCH reception from the number of PSFCH reception occasions corresponding to PSSCH transmissions or, if the UE determines that a PSFCH is not received at the last PSFCH reception occasion and ACK is not received in any of previous PSFCH reception occasions, generate NACK
- for one or more PSFCH reception occasions associated with SCI format 2-A with Cast type indicator field value of "01"
  - generate ACK if the UE determines ACK from at least one PSFCH reception occasion, from the number of PSFCH reception occasions corresponding to PSSCH transmissions, in PSFCH resources corresponding to every identity $M_{ID}$ of the UEs that the UE expects to receive the PSSCH, as described in clause 16.3; otherwise, generate NACK
- for one or more PSFCH reception occasions associated with SCI format 2-B or SCI format 2-A with Cast type indicator field value of "11"
  - generate ACK when the UE determines absence of PSFCH reception for the last PSFCH reception occasion from the number of PSFCH reception occasions corresponding to PSSCH transmissions; otherwise, generate NACK After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.

The UE generates a NACK when, due to prioritization, as described in clause 16.2.4, the UE does not receive PSFCH in any PSFCH reception occasion associated with a PSSCH transmission in a resource provided by a DCI format 3_0 or, for a configured grant, in a resource provided in a single period and for which the UE is provided a PUCCH resource to report HARQ-ACK information. The priority value of the NACK is same as the priority value of the PSSCH transmission.

The UE generates a NACK when, due to prioritization as described in clause 16.2.4, the UE does not transmit a PSSCH in any of the resources provided by a DCI format 3_0 or, for a configured grant, in any of the resources provided in a single period and for which the UE is provided a PUCCH resource to report HARQ-ACK information. The priority value of the NACK is same as the priority value of the PSSCH that was not transmitted due to prioritization.

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

Sidelink (SL) Discontinuous Reception (DRX)

A MAC entity may be configured by an RRC as a DRX function of controlling a PDCCH monitoring activity of a UE for C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI, and SL Semi-Persistent Scheduling V-RNTI of the MAC entity. When using a DRX operation, a MAC entity should monitor PDCCH according to prescribed requirements. When DRX is configured in RRC_CONNECTED, a MAC entity may discontinuously monitor PDCCH for all activated serving cells.

RRC may control a DRX operation by configuring the following parameters.

drx-onDurationTimer: Duration time upon DRX cycle start drx-SlotOffset: Delay before drx-onDurationTimer start drx-InactivityTimer: Duration time after PDCCH that indicates new UL or DL transmission for a MAC entity drx-RetransmissionTimerDL (per DL HARQ process except for the broadcast process): Maximum duration time until DL retransmission is received drx-RetransmissionTimerUL (per UL HARQ process): Maximum time until a grant for retransmission is received drx-LongCycleStartOffset: Long DRX cycle and drx-StartOffset that define a subframe in which Long and Short DRX cycles start drx-ShortCycle(optional): Short DRX cycle drx-ShortCycleTimer(optional): Period for a UE to follow a short CRX cycle drx-HARQ-RTT-TimerDL (per DL HARQ process except for the broadcast process): Minimum duration time before DL allocation for HARQ retransmission is predicted by a MAC entity drx-HARQ-RTT-TimerUL (per UL HARQ process): Minimum duration time before a UL HARQ retransmission grant is predicted by a MAC entity drx-RetransmissionTimerSL (per HARQ process): Maximum period until a grant for SL retransmission is received drx-HARQ-RTT-TimerSL (per HARQ process): Minimum duration time before an SL retransmission grant is predicted by a MAC entity ps-Wakeup (optional): Configuration for starting drx-onDurationTimer connected when DCP is monitored but not detected ps-TransmitOtherPeriodicCSI (optional): Configuration to report a periodic CSI that is not L1-RSRP on PUCCH for a time duration period indicated by drx-onDurationTimer when connected drx-onDurationTimer does not start despite that DCP is configured ps-TransmitPeriodicL1-RSRP (optional): Configuration to transmit a periodic CSI that is L1-RSRP on PUCCH for a time indicated by a drx-onDurationTimer when a connected drx-onDurationTimer does not start despite that DCP is configured A serving cell of a MAC entity may be configured by RRC in two DRX groups having separate DRX parameters. When the RRC does not configure a secondary DRX group, a single DRX group exists only and all serving cells belong to the single DRX group. When two DRX groups are configured, each serving cell is uniquely allocated to each of the two groups. DRX parameters separately configured for each DRX group include drx-onDurationTimer and drx-InactivityTimer. A DRX parameter common to a DRX group is as follows.

drx-onDurationTimer, drx-InactivityTimer.

DRX parameters common to a DRX group are as follows.
drx-SlotOffset, drx-RetransmissionTimerDL, drx-Retrans drx-SlotOffset, drx-RetransmissionTimerDL, drx-RetransmissionTimerUL, drx-LongCycleStartOffset, drx-Short-Cycle (optional), drx-ShortCycleTimer (optional), drx-HARQ-RTT-TimerDL, and drx-HARQ-RTT-TimerUL.

For the DRX operation in the prior art, drx-HARQ-RTT-TimerDL, drx-HARQ-RTT-TimerUL, drx-RetransmissionTimerDL, and drx-RetransmissionTimerUL are defined. When the UE performs HARQ retransmission, the UE may be allowed to transition to the sleep mode during an RTT timer (drx-HARQ-RTT-TimerDL, drx-HARQ-RTT-TimerUL, etc.) or maintain the active state during a retransmission timer (drx-RetransmissionTimerDL, drx-RetransmissionTimerUL, etc.)

In addition, for details of SL DRX, SL DRX-related contents of TS 38.321, TS 38.331 and R2-2111419 may be referred to as the related art.

Release 16 NR V2X did not support the power saving (PS) operation of the UE, but Release 17 NR V2X plans to support the PS operation of the UE (e.g., PS UE). For the PS operation (e.g., SL DRX operation) of the UE, SL DRX configurations to be used by the PS UE (P-UE) (e.g., SL DRX cycle, SL DRX ON duration, SL DRX OFF duration, timers for supporting SL DRX operation, etc.) need to be defined. In addition, the operations of a transmitting UE (TX UE) and a receiving UE (RX UE) in the ON duration (i.e., a duration in which SL reception/transmission is allowed) and/or OFF Duration (i.e., a duration in which the UE operates in sleep mode) need to also be defined.

The SL DRX operation will be described in embodiment(s) of the present disclosure. Specifically, methods in which a RX UE operates an SL DRX timer when the RX UE drops a PSFCH (ACK/NACK) (due to prioritization, etc.) or performs NACK-only feedback operation based on a TX-RX distance will be described. In the following description, the following expressions 'when', 'if', and/or 'in case of' may be replaced with 'based on'.

Figure 11:
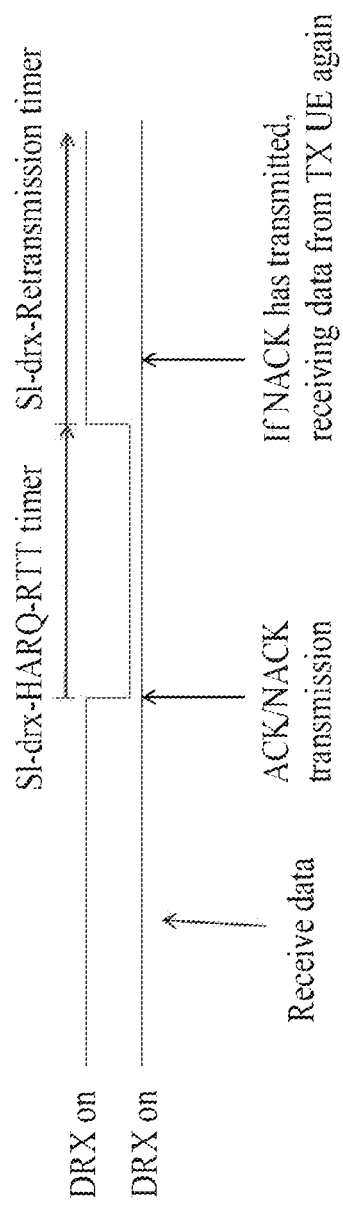
FIG. 11 and FIG. 12 are diagrams to describe embodiment(s)

FIG. 11 illustrates a DRX-related SL signal transmission/reception operation, an RTT timer operation, a retransmission timer operation of an SL RX UE when the PS operation is supported. Referring to FIG. 11, the SL RX UE in the DRX OFF state may receive SL data from a TX UE and perform ACK/NACK transmission for the received SL data (over a PSFCH). If the RX UE transmits a NACK, the RX UE may receive data again from the TX UE. If the RX UE is in the DRX ON state, the RX UE may perform ACK/NACK transmission, start an SL-drx-HARQ-RTT timer (hereinafter referred to as an RTT timer), and then enter the sleep mode for power saving. If the RX UE transmits a NACK, the RX UE may wake up after the RTT timer expires. Then, the RX UE may wait for reception of data transmitted (or retransmitted) from the TX UE in order to receive the data.

Based on the above operations, the operations of the RX UE when transmission of ACK or NACK information is dropped will be described in detail from the perspective of the RX UE that needs to transmit HARQ feedback in SL communication.

Figure 12:
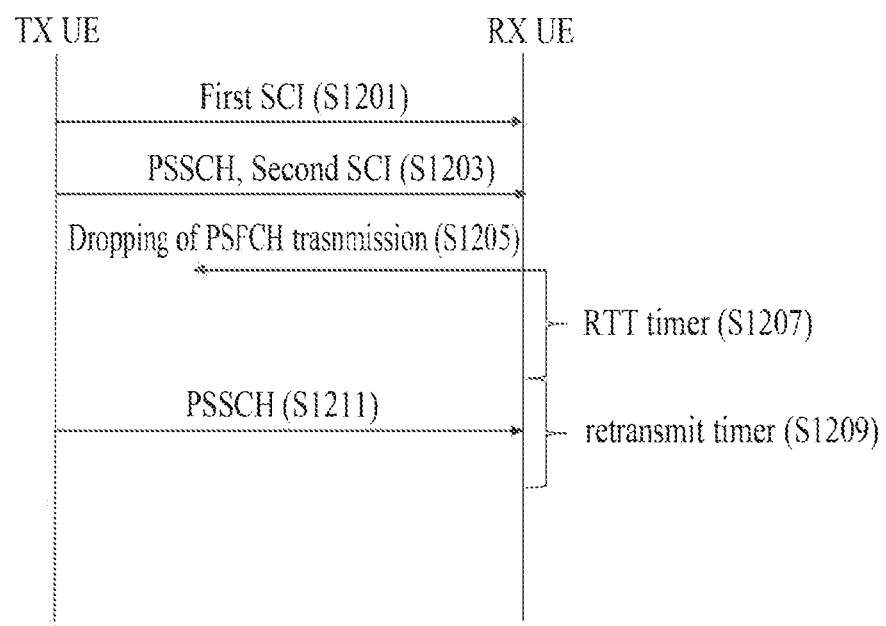

Referring to FIG. 12, an RX UE may receive first SCI from a TX UE on a PSCCH (S1201). The RX UE may receive a PSSCH and second SCI from the TX UE based on the first SCI (S1201). The second SCI may include information for activating transmission of a PSFCH related to the PSSCH. Accordingly, the RX UE may transmit an ACK/NACK for the PSSCH over the PSFCH. Whether the RX UE starts a retransmission timer, which is based on that the PSFCH transmission is dropped, may be determined based on whether the dropped PSFCH transmission is related to a NACK or ACK. Specifically, based on that the PSFCH is related to the NACK, the RX UE may start the retransmission timer, and based on that the PSFCH is related to the ACK, the RX UE may not start the retransmission timer. Thus, even if the RX UE drops NACK feedback transmission (S1205), the RX UE may start an RTT timer (S1207). When the RTT timer expires, the RX UE may start the retransmission timer (S1209). Therefore, while the retransmission timer is running, the RX UE may wait for and receive PSSCH transmission (or retransmission) in the wake-up state (S1211).

That is, from the perspective of the RX UE that needs to transmit HARQ feedback in SL communication, when ACK or NACK information transmission is dropped, and more particularly, when NACK information transmission is dropped, the RX UE may be allowed to start the SL DRX timer (e.g., retransmission timer, RTT timer, etc.).

In each embodiment, whether the SL DRX timer starts may be defined equally regardless of whether dropped information is an ACK or NACK (ALT 1). Alternatively, the RX UE may be configured to always start (or not start) the RTT timer (and/or retransmission timer) regardless of whether dropped information is an ACK or NACK (ALT 2).

The RTT timer may be started based on PSFCH resources. The time at which the RTT timer or retransmission (TX) timer described above starts may be determined based on a predefined (and/or configured) reference time. In this case, the predefined (and/or configured) reference time may include the following cases as well as the time at which an ACK/NACK signal is to be transmitted over a PUCCH/PUSCH. For example, for a MAC PUD where HARQ feedback is enabled (HARQ feedback enabled MAC PUD), the timer may be started based on PSFCH resources. For a MAC PUD where HARQ feedback (and/or blind retransmission) is disabled (HARQ feedback disabled MAC PDU, the timer may be started based on first transmission.

The RTT timer may be related to transition to the sleep mode after transmission of the PSFCH, and the retransmission timer may be related to reception of retransmission from the TX UE based on the PSFCH. While the retransmission timer is running, the RX UE may maintain the wake-up state and receive data from the TX UE. The data may be retransmission on the PSSCH.

The PSSCH may be related to unicast. Alternatively, the PSSCH may be related to groupcast. In this case, the PSFCH may be related to NACK-only HARQ feedback According to the above configurations, the RX UE may stably receive data retransmitted by the TX UE while performing the PS operation. Specifically, when the TX UE transmits second SCI including HARQ enabling, the TX UE may not receive an ACK from the RX UE and thus perform PSSCH retransmission. Even if a PSFCH is dropped, the RX UE may start the retransmission timer after expiration of the RTT timer and receive the PSSCH retransmission in the wake-up state.

From the perspective of the RX UE that needs to transmit HARQ feedback in SL communication, when ACK or NACK information transmission is dropped, and more particularly, when ACK information transmission is dropped, the RX UE may be configured not to start the SL DRX timer (e.g., retransmission timer). In this case, even if the ACK information transmission is dropped, the RX UE may be exceptionally configured to start the RTT timer. That is, since the RX UE successfully receives/decodes desired information but the ACK therefor is dropped, even if the TX UE retransmits the same information, the RX UE may not operate the retransmission timer without receiving the information, thereby focusing more on the PS operation.

As another example, from the perspective of the RX UE that needs to transmit HARQ feedback in SL communication. When ACK or NACK information transmission is dropped, and more particularly, when ACK information transmission is dropped, if the RX UE is configured to start the SL DRX timer (e.g., retransmission timer), an operation of flushing a related SL HARQ process buffer may be configured to be performed after a PSFCH containing ACK information is actually transmitted (this is different from that of conventional Rel-16 NR V2X). Alternatively, the operation of flushing the related SL HARQ process buffer may be configured to be performed at the time when the RX UE successfully receives/decodes data (and/or at the time when the RX UE receives new data with the same SL HARQ process ID where a new data indicator (NDI) is toggled (from the same TX UE)).

As a further example, from the perspective of the RX UE that needs to transmit HARQ feedback in SL communication, when ACK or NACK information transmission is dropped, and more particularly, when NACK information transmission is dropped, the RX UE may be configured not to start the SL DRX timer (e.g., retransmission timer). Even in this case, the RX UE may be configured to start the SL DRX RTT timer.

Hereinafter, embodiments related to the DRX timer for NACK-only HARQ feedback operation or for NACK-only HARQ feedback operation based on a minimum required communication range (MCRG) will be described.

For the MCRG-based NACK-only HARQ feedback operation (and/or NACK-only HARQ feedback operation), when the RX UE is located within the MCRG, the RX UE may operate according to one of [ALT 1] and [ALT 2] described above (which is configured in advance). On the other hand, when the RX UE is located outside the MCRG, even if the RX UE fails to decode received data (and/or regardless of whether the RX UE fails to decode the received data), the RX UE may be configured not to start the SL DRX timer (e.g., retransmission timer, RTT timer, etc.). Alternatively, if the RX UE fails to decode the received data, the RX UE may be configured to start the SL DRX timer (e.g., retransmission timer, RTT timer, etc.).

For NACK-only HARQ feedback operation (based on a TX-RX distance), if the RX UE drops NACK transmission, the RX UE may operate the SL DRX timer (for example, considering the possibility that another member UE related to groupcast performs NACK transmission and thus the TX UE performs retransmission). In this case, a related SL HARQ process buffer may be flushed when the SL DRX timer expires.

For the NACK-only HARQ feedback operation (based on the TX-RX distance), if the RX UE drops NACK transmission, the RX UE may not operate the SL DRX timer (for example, considering the possibility that the TX UE misidentifies dropping of the NACK transmission of the RX UE as an ACK and thus does not perform retransmission). In this case, the RX UE may be exceptionally configured to start the RTT timer. In this case, a related HARQ process buffer may be flushed at the time when the NACK transmission is dropped. Alternatively, the related HARQ process buffer may be flushed at the time when the RX UE receives new data with the same SL HARQ process ID where an NDI is toggled (from the same TX UE).

For the NACK-only HARQ feedback operation (based on the TX-RX distance), different SL DRX timer values (and/or different SL DRX configuration related parameters) may be configured depending on whether the UE is located within or outside the MCRG. The value of the SL DRX timer of a UE located outside the MCRG may be a smaller value (shorter time) than the value of the SL DRX timer of a UE located within the MCRG. This is because the UE located outside the MCRG does not necessarily have to satisfy service-related (reliability/delay) requirements, unlike the UE located within the MCRG. For example, whether the UE outside the MCRG starts the SL DRX timer (when the UE fails to decode data) may be determined by UE implementation.

For the NACK-only HARQ feedback operation (based on the TX-RX distance), if the RX UE located within the MCRG leaves the MCRG, the RX UE may be configured to stop (or initialize) the SL DRX timer (e.g., retransmission timer, RTT timer, etc.) that the RX UE is operating (within the MCRG) (due to failure to decode received data (and/or PSFCH transmission containing NACK information)) (for example, the timer may be considered to be no longer valid (and/or expired)).

For the NACK-only HARQ feedback operation (based on the TX-RX distance), if the RX UE located within the MCRG leaves the MCRG, the RX UE may be configured to continue to decrease the SL DRX timer (e.g., retransmission timer, RTT timer, etc.) that is currently running (within the MCRG range) (due to failure to decode received data (and/or PSFCH transmission containing NACK information)). However, the RX UE may be configured not to decode (or configured to decode) SCI (and/or data) based on the corresponding SL DRX timer (within a generated active time). In this case, for example, if the RX UE enters the MCRG again (before the timer expires), the RX UE may be configured to decode the SCI (and/or data) again based on the remaining duration of the SL DRX timer. Additionally, for the NACK-only HARQ feedback operation (based on the TX-RX distance), if the RX UE located within the MCRG leaves the MCRG, the RX UE may be configured to (temporarily) stop the SL DRX timer (e.g., retransmission timer, RTT timer, etc.) that is currently running (within the MCRG range) (due to failure to decode received data (and/or PSFCH transmission containing NACK information)). However, the RX UE may be configured not to decode SCI (and/or data). In this case, for example, if the RX UE enters the MCRG again, the RX UE may be configured to decode the SCI (and/or data) again based on the remaining duration of the SL DRX timer (for example, it may be interpreted to mean that the RX UE restarts the (temporarily) stopped timer). In addition, the (maximum) valid time (MAX_VALWIN) of the (temporarily) suspended SL DRX timer may be configured/limited in advance (for example, if the RX UE does not enter the MCRG again before expiration of MAX_VALWIN, it may be interpreted to mean that that the (temporarily) suspended SL DRX timer is no longer valid (and/or the timer expires)).

In the above embodiment, the RTT timer, which is a timer for SL DRX operation, may be HARQ-RTT-TimerSL, and the retransmission (TX) timer may be DRX-HARQ-RetransmissionSL.

The embodiments may be a solution applicable when a UE receives SCI from another UE at the end of an SL active time (i.e., a duration in which the UE monitors SL channels or signals) and when a next transmission resource reserved by the SCI received within the active time is within an SL inactive time (i.e., a duration in which the UE does not need to monitor SL channels or signals, that is, a duration in which the UE is capable of operating in the power saving mode). In addition, the embodiments may be a solution that may be equally applied to the SL active time duration and the SL inactive time duration of the UE.

The proposals of the present disclosure may be extended and applied not only to a default/common SL DRX configuration, a default/common SL DRX pattern, or parameters (and timers) included in the default/common SL DRX configuration but also to a UE-pair specific SL DRX pattern, a UE-pair specific SL DRX configuration, or parameters (and timers) included in the UE-pair specific SL DRX configuration. In addition, the term "ON duration" mentioned in the proposals of the present disclosure may be extended and interpreted as an active time duration (i.e., a duration in which the UE operates in the wake-up state (RF modules are "ON") to receive/transmit radio signals). The term "OFF duration" may be extended and interpreted as a sleep time duration (i.e., a duration in which the UE operates in the sleep mode (RF modules are "OFF") for power saving). (Which does not mean that the TX UE needs to operate in the sleep mode during the sleep time duration. If necessary, even during sleep time duration, the TX UE may be allowed to operate as in the active time for a while for sensing/transmission.) The application of the proposed methods/rules of the present disclosure (or some thereof) and/or related parameters (e.g., threshold) may be configured specifically (differently or independently) depending on resource pools, congestion levels, service priorities (and/or types), requirements (e.g., latency, reliability, etc.), traffic types (e.g., periodic generation, aperiodic generation, etc.), SL transmission resource allocation modes (e.g., mode 1, mode 2, etc.), and so on.

For example, the application of the proposed rules of the present disclosure (and/or related parameter configuration values) may be configured specifically (differently and/or independently) depending on at least one of the following: UE types (e.g., PS UE), resource pools, service/packet types (and/or priorities), QoS requirements (e.g., URLLC/EMBB traffic, reliability, latency, etc.), cast types (e.g., unicast, groupcast, broadcast, etc.), (resource pool) congestion levels (e.g., CBR), SL HARQ feedback methods (e.g., NACK-only feedback, ACK/NACK feedback, etc.), when a HARQ feedback enabled MAC PDU (and/or HARQ feedback disabled MAC PDU) is transmitted, whether an operation of reporting PUCCH-based SL HARQ feedback is configured, when the SL DRX operation is performed, when pre-emption (and/or re-evaluation) is performed (or when resources are reselected based thereon), (L2 or L1) (source and/or destination) identifiers, PC5 RRC connections/links, when SL DRX is performed, SL mode types (resource allocation mode 1, resource allocation mode 2, etc.), when periodic (or aperiodic) resource reservation is performed, etc.

The term "a certain period of time" mentioned in the proposals of the present disclosure may refer to a predefined period of time for which the UE operates as in the active time or a period of time for which the UE operates as in the active time based on a specific timer (e.g., an SL DRX retransmission timer, an SL DRX inactivity timer, or a timer that guarantees that the RX UE operates as in the active time during DRX operation).

The application of the proposed methods/rules of the present disclosure (and/or related parameter configuration values) may also be applied to millimeter wave (mmWave) SL operations.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
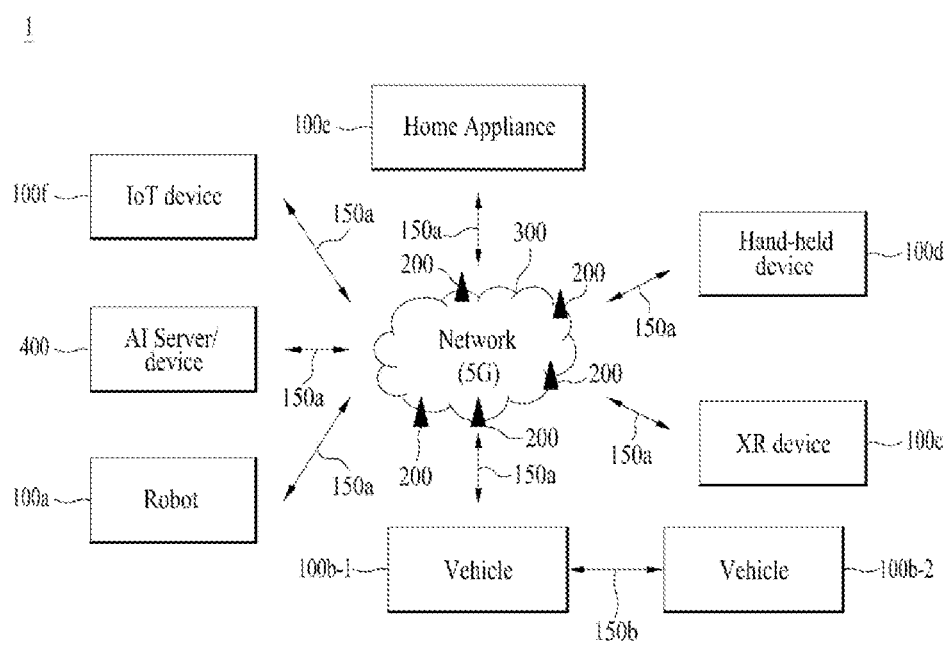
FIGS. 13 to 19 are diagrams illustrating various devices to which embodiment(s) are applicable.

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 14:
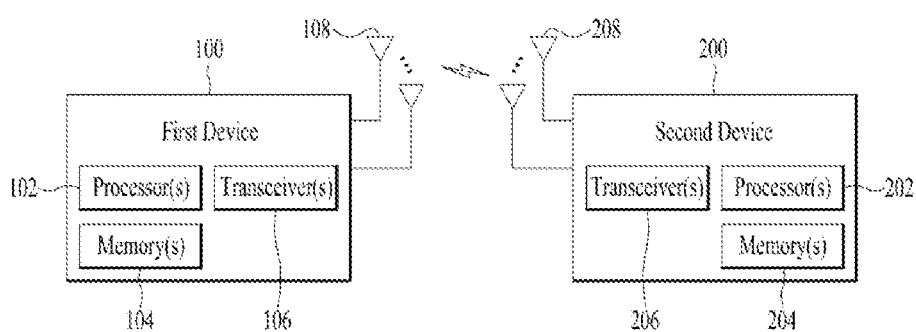

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
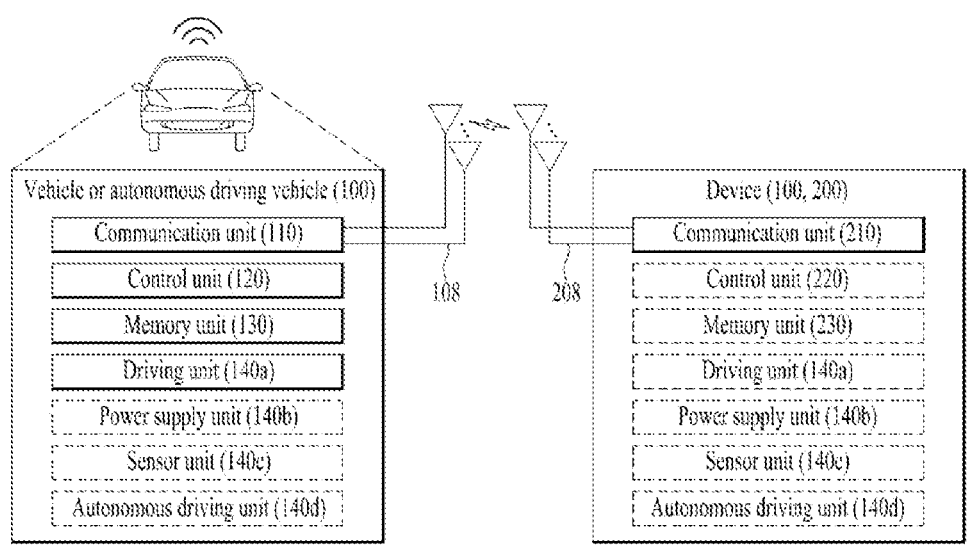

Examples of a Vehicle or an Autonomous Driving Vehicle Applicable to the Present Disclosure FIG. 15 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 16:
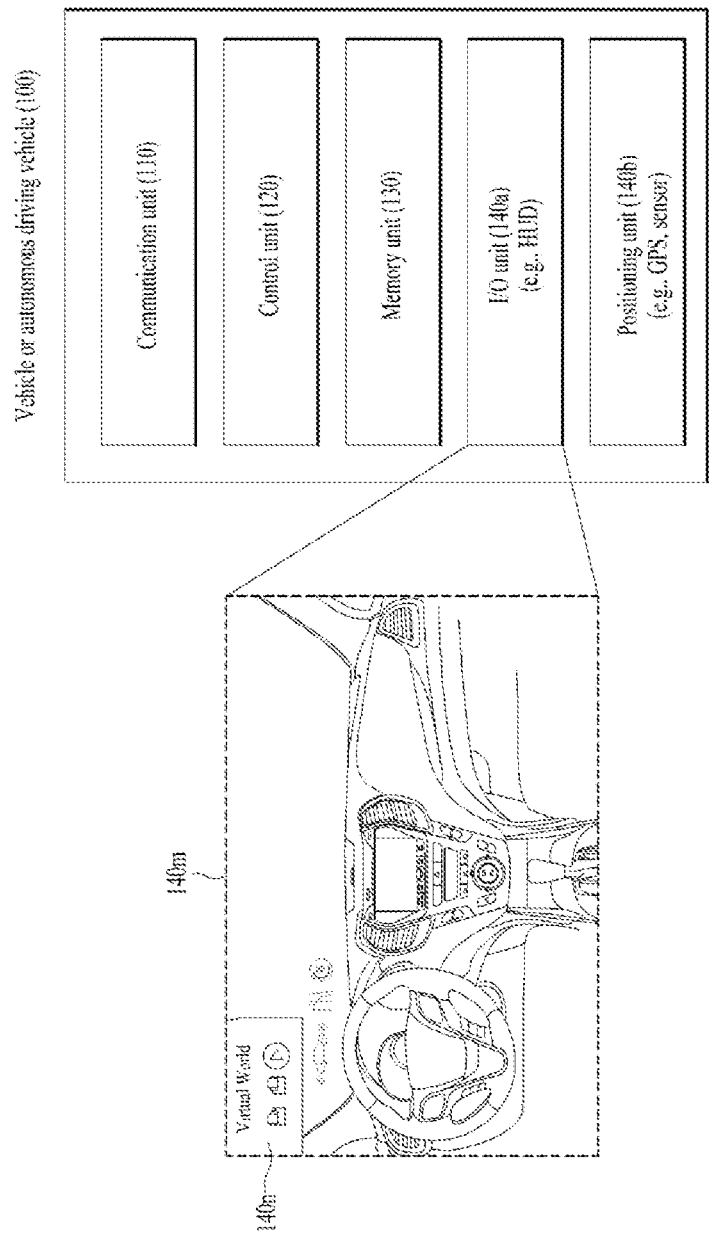

FIG. 16 illustrates a vehicle applied to the present disclosure. The vehicle may be implemented as a transport means, an aerial vehicle, a ship, etc.

Referring to FIG. 16, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 17:
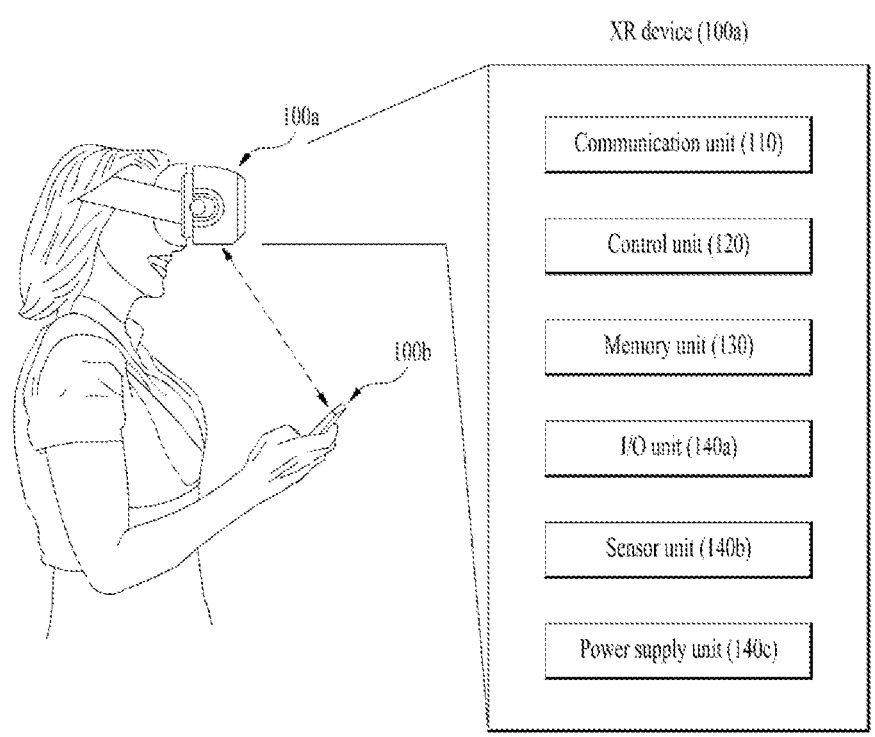

FIG. 17 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 17, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 18:
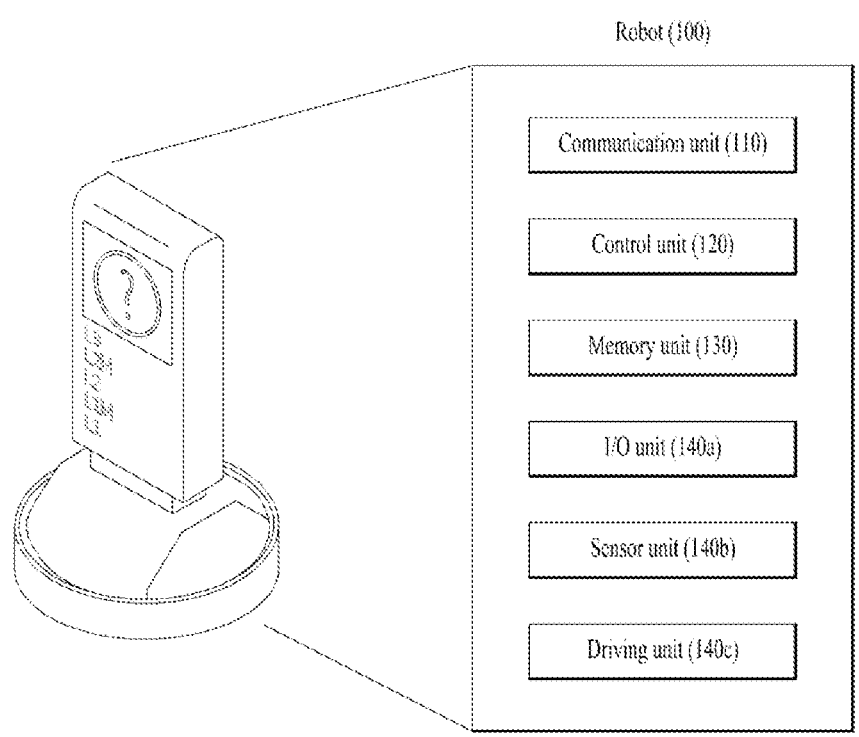

FIG. 18 illustrates a robot applied to the present disclosure. The robot may be categorized into an industrial robot, a medical robot, a household robot, a military robot, etc., according to a used purpose or field.

Referring to FIG. 18, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 14, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI device to which the present disclosure is applied.

Figure 19:
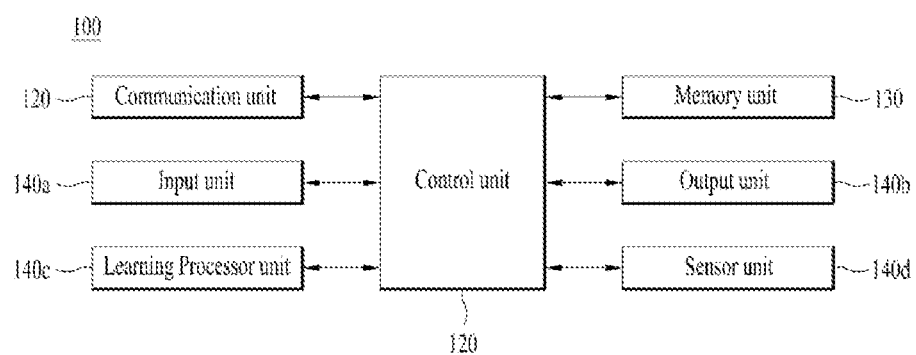

FIG. 19 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 19, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 14, respectively.

The communication unit 110 may transmit and receive wired/radio signals (e.g., sensor information, user input, learning models, or control signals) to and from external devices such as other AI devices (e.g., 100*x*, 200, or 400 of FIG. 13) or an AI server (e.g., 400 of FIG. 13) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 13). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 13). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The above-described embodiments of the present disclosure are applicable to various mobile communication systems.

What is claimed is:

1. A method performed by a first User Equipment (UE) in a wireless communication system, the method comprising:
    receiving, by the first UE, first control information from a second UE over a physical control channel; and
    receiving, by the first UE, second control information included in a physical data channel from the second UE, based on the first control information,
    wherein the second control information includes information for enabling a Hybrid Automatic Repeat Request (HARQ) feedback for the physical data channel,
    wherein based on the HARQ feedback being not transmitted and being Negative Acknowledgement (NACK), the first UE starts a retransmission timer related to a Discontinuous Reception (DRX) between the first UE and the second UE, and
    wherein, based on the HARQ feedback being not transmitted and being ACK, the first UE does not start the retransmission timer related to the DRX.

2. The method of claim 1, wherein a round trip time (RTT) timer is started based on a resource for the HARQ feedback.

3. The method of claim 1, wherein the physical data channel is related to unicast.

4. The method of claim 1, wherein a round trip time (RTT) timer is related to transition to a sleep mode after the HARQ feedback transmission.

5. The method of claim 1, wherein the retransmission timer is related to receiving a retransmission from the second UE based on the HARQ feedback.

6. The method of claim 1, wherein the first UE is configured to maintain a wake-up state during the retransmission timer.

7. The method of claim 1, wherein the physical data channel is related to groupcast.

8. A first user equipment (first UE) configured to operate in a wireless communication system, the first UE comprising:
- at least one processor; and
- at least one computer memory operably connected to the at least one processor and configured to store instructions that, when executed, cause the at least one processor to perform operations comprising:
- receiving a first control information from a second UE through a physical control channel; and
- receiving second control information included in a physical data channel from the second UE, based on the first control information,
- wherein the second control information includes information for enabling a Hybrid Automatic Repeat Request (HARQ) feedback for the physical data channel,
- wherein based on the HARQ feedback being not transmitted and being Negative Acknowledgement (NACK), the first UE starts a retransmission timer related to a Discontinuous Reception (DRX) between the first UE and the second UE, and
- wherein, based on the HARQ feedback being not transmitted and being ACK, the first UE does not start the retransmission timer related to the DRX.

9. The first UE of claim 8, wherein the first UE is configured to communicate with at least one of another user equipment (UE), a UE related to an autonomous vehicle, a base station, or a network.

10. A non-transitory computer-readable storage medium configured to store at least one computer program comprising instructions that, when executed by at least one processor, cause the at least one processor to perform operations for a first user equipment (first UE), the operations comprising:
- receiving a first control information from a second UE through a physical control channel; and
- receiving second control information included in a physical data channel from the second UE, based on the first control information,
- wherein the second control information includes information for enabling a Hybrid Automatic Repeat Request (HARQ) feedback for the physical data channel,
- wherein based on the HARQ feedback being not transmitted and being Negative Acknowledgement (NACK), the first UE starts a retransmission timer related to a Discontinuous Reception (DRX) between the first UE and the second UE, and
- wherein, based on the HARQ feedback being not transmitted and being ACK, the first UE does not start the retransmission timer related to the DRX.

* * * * *